A. WONDERLY.
Car-Couplings.

No. 158,662.  Patented Jan. 12, 1875.

Witnesses
John L. Boone
C. M. Richardson

Inventor
Alexander Wonderly
by Dewey & Co
Atty's

UNITED STATES PATENT OFFICE.

ALEXANDER WONDERLY, OF PALISADE, NEVADA.

IMPROVEMENT IN CAR-COUPLINGS.

Specification forming part of Letters Patent No. 158,662, dated January 12, 1875; application filed September 16, 1874.

*To all whom it may concern:*

Be it known that I, ALEXANDER WONDERLY, of Palisade, Eureka county, State of Nevada, have invented an Improved Car-Coupling; and I do hereby declare the following description and accompanying drawings are sufficient to enable any person skilled in the art or science to which it most nearly appertains to make and use my said invention or improvement without further invention or experiment.

My invention relates to certain improvements upon the car-coupling for which Letters Patent No. 149,624, and dated April 14, 1874, were granted to me.

My improvements are fully explained in the following description, reference being had to the drawings accompanying this specification, in which—

Figure 1:
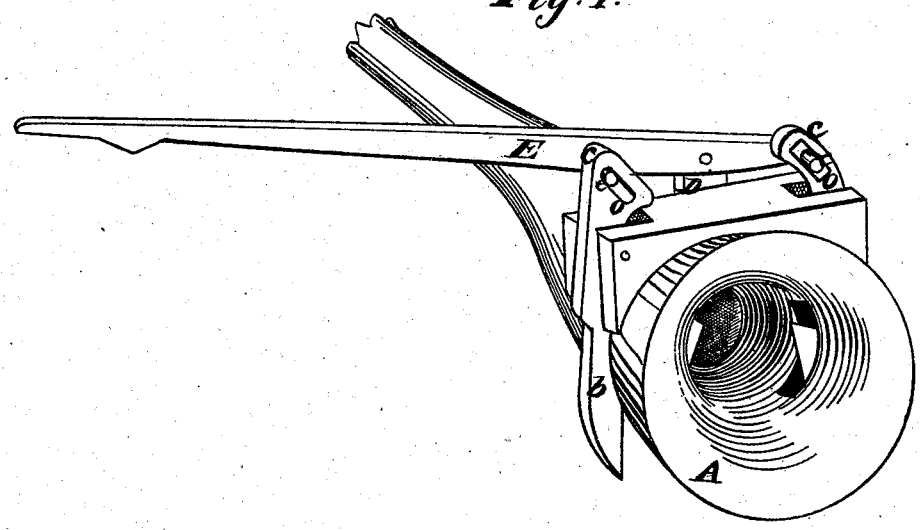
Figure 2:
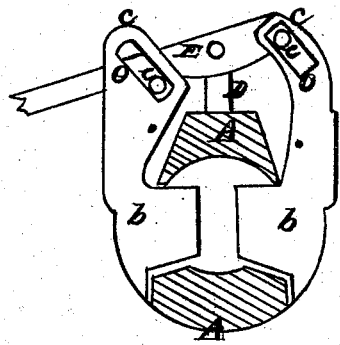
Figure 3:
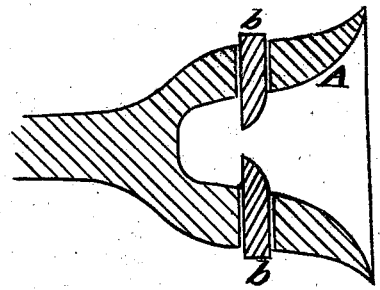

Figure 1 is a perspective view of my coupling. Fig. 2 is a transverse section. Fig. 3 is a horizontal section.

A is the metallic buffer, which is provided, as described in my former patent, with a vertical slot or opening at each side, in which the dogs *b b* are secured, so as to extend through the sides of the buffer, and partially across the opening inside of it. Instead of hinging these dogs at their lower end, so that their upper ends will fall outward by gravity, as described in my former patent, I secure them by a pivot at the upper ends of the slots. The upper ends of the dogs I extend above the draw-head a short distance, as shown at *c c*, so that by pressing these projecting ends toward each other, the lower ends of the dogs will be forced apart, and consequently be withdrawn from across the link-opening inside of the bumper. D is a short standard, which is secured upon the draw-head midway between the upward-projecting ends *c c* of the dogs *b b*, and a sufficient distance in rear of them to permit a lever, E, to be interposed between them. This lever is pivoted a short distance from one end to the standard D, and has two pins, *e e*, projecting from it in the proper position to allow one of them to enter an angular slot, *o*, in the extension *c* of each dog. The slots *o* in both of the extensions *c* incline in the same direction, and as the pins which move in them are on opposite sides of the point or fulcrum of the lever E, the dogs will be moved in opposite directions by raising and lowering the lever. When the handle of the lever is down, the dogs will be closed into the buffer-head so as to stand partially across the link-opening, and as the outer end of the lever is raised, the action of the pins on the angular slots will force their lower ends apart, so as to withdraw them from across the opening. The weight of the outer end of the lever will be sufficient to keep the dogs closed.

The link which I use is the same as described in my former patent—that is, a bar having an oval pointed head at each end—so that when it enters the buffer-head forcibly, the dogs *b b* will be forced outward, so as to let the link-head pass. The weight of the outer end of the lever will then close the dogs upon the bar, so as to retain the head inside of the bumper. To release the link it is only necessary to raise the outer end of the lever E, so as to separate the dog and free the link-head. It will be readily seen that I thus greatly simplify the arrangement of my car-coupler, and render it cheaper without injuring its effectiveness.

Having thus described my invention, what I claim, and desire to secure by Letters Patent, is—

The dogs *b b*, pivoted or hinged in the upper end of the slots in the sides of the buffer-head, each of which has an angularly-slotted extension, *c*, in combination with the lever E, having its fulcrum between the extended ends of said dogs, and the pins *e e*, to operate in the angular slot *o*, substantially as and for the purpose described.

In witness whereof I hereunto set my hand and seal.

ALEXANDER WONDERLY. [L. S.]

Witnesses:
WILL N. RABBITTS,
W. M. FALES.